US012675273B2

(12) United States Patent
Groden et al.

(10) Patent No.: US 12,675,273 B2
(45) Date of Patent: Jul. 7, 2026

(54) SOFTWARE UPDATE SYSTEM FOR AERIAL VEHICLES

(71) Applicant: Skyryse, Inc., El Segundo, CA (US)

(72) Inventors: Mark Daniel Groden, Marina Del Rey, CA (US); Gonzalo Javier Rey, Torrance, CA (US)

(73) Assignee: Skyryse, Inc., El Segundo, CA (US)

( * ) Notice: Subject to any disclaimer, the term of this patent is extended or adjusted under 35 U.S.C. 154(b) by 101 days.

(21) Appl. No.: 18/239,652

(22) Filed: Aug. 29, 2023

(65) Prior Publication Data

US 2024/0069890 A1      Feb. 29, 2024

Related U.S. Application Data

(60) Provisional application No. 63/401,997, filed on Aug. 29, 2022.

(51) Int. Cl.
*G06F 9/445*      (2018.01)
*G06F 8/65*      (2018.01)

(52) U.S. Cl.
CPC ..................................... *G06F 8/65* (2013.01)

(58) Field of Classification Search
CPC ..... G06F 8/71; G06F 8/61; G06F 8/60; G06F 8/658; G06F 11/1433
See application file for complete search history.

(56) References Cited

U.S. PATENT DOCUMENTS

| | | | |
|---|---|---|---|
| 6,438,468 B1 | 8/2002 | Muxlow et al. | |
| 9,807,149 B2 * | 10/2017 | Kimberly | ............... G01C 23/00 |
| 2004/0106404 A1 * | 6/2004 | Gould | ....................... G06F 8/60 |
| | | | 455/431 |
| 2005/0039006 A1 | 2/2005 | Stelling et al. | |
| 2008/0295090 A1 | 11/2008 | Bestle et al. | |
| 2013/0067450 A1 * | 3/2013 | Saugnac | ................. H04L 67/12 |
| | | | 717/170 |
| 2016/0098259 A1 | 4/2016 | Mitchell | |
| 2018/0101377 A1 | 4/2018 | Wingate et al. | |
| 2018/0167391 A1 | 6/2018 | Lawson et al. | |
| 2020/0028691 A1 * | 1/2020 | Rao | ........................ G06F 8/658 |
| 2020/0092052 A1 | 3/2020 | MacAfee et al. | |
| 2020/0348148 A1 | 11/2020 | B et al. | |

OTHER PUBLICATIONS

PCT International Search Report and Written Opinion, PCT Application No. PCT/US23/31438, Jan. 30, 2024, 27 pages.
PCT Invitation to Pay Additional Fees, PCT Application No. PCT/US2023/031438, Oct. 24, 2023, two pages.

* cited by examiner

*Primary Examiner* — Chuck O Kendall
(74) *Attorney, Agent, or Firm* — Fenwick & West LLP

(57) ABSTRACT

A software update system is disclosed for managing a remote software updating process for aerial vehicles. Responsive to receiving an indication from a companion application that an update for a display or a Flight Control Computer (FCC) is available for installation, the software update system may determine if a set of requirements are met by retrieving information associated with the aircraft from the sensors of the aircraft. The software update system may determine whether the aircraft is suitable for performing the installation of the update by checking a set of requirements and retrieving information from the sensors of the aircraft. The software update system may further determine if the update is for a display or an FCC and perform a different remote update process for each type of update correspondingly.

14 Claims, 8 Drawing Sheets

SOFTWARE UPDATE SYSTEM FOR AERIAL VEHICLES

CROSS REFERENCE TO RELATED APPLICATIONS

This application claims the benefit of, and priority to, U.S. Provisional Application No. 63/401,997, filed Aug. 29, 2022, the contents of which is incorporated by reference in its entirety.

TECHNICAL FIELD

The disclosure generally relates to the field of vehicle control systems, and particularly to a software update system for aerial vehicles.

BACKGROUND

Software updating process for vehicle control (e.g., aircraft control) often has a higher safety requirement than a software updating process on personal computers. Generally, vehicle control and interface systems, such as control systems for aerial vehicles (e.g., rotorcraft or fixed wing aircraft), often require specialized knowledge and training for operation by a human operator. The specialized knowledge and training are necessitated, for instance, by the complexity of the control systems and safety requirements of the corresponding vehicles. Conventionally, aircraft software updating process requires a human operator to interfere in the process such as to approve certain operations or to ensure that compliance requirements are met for updating the software.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
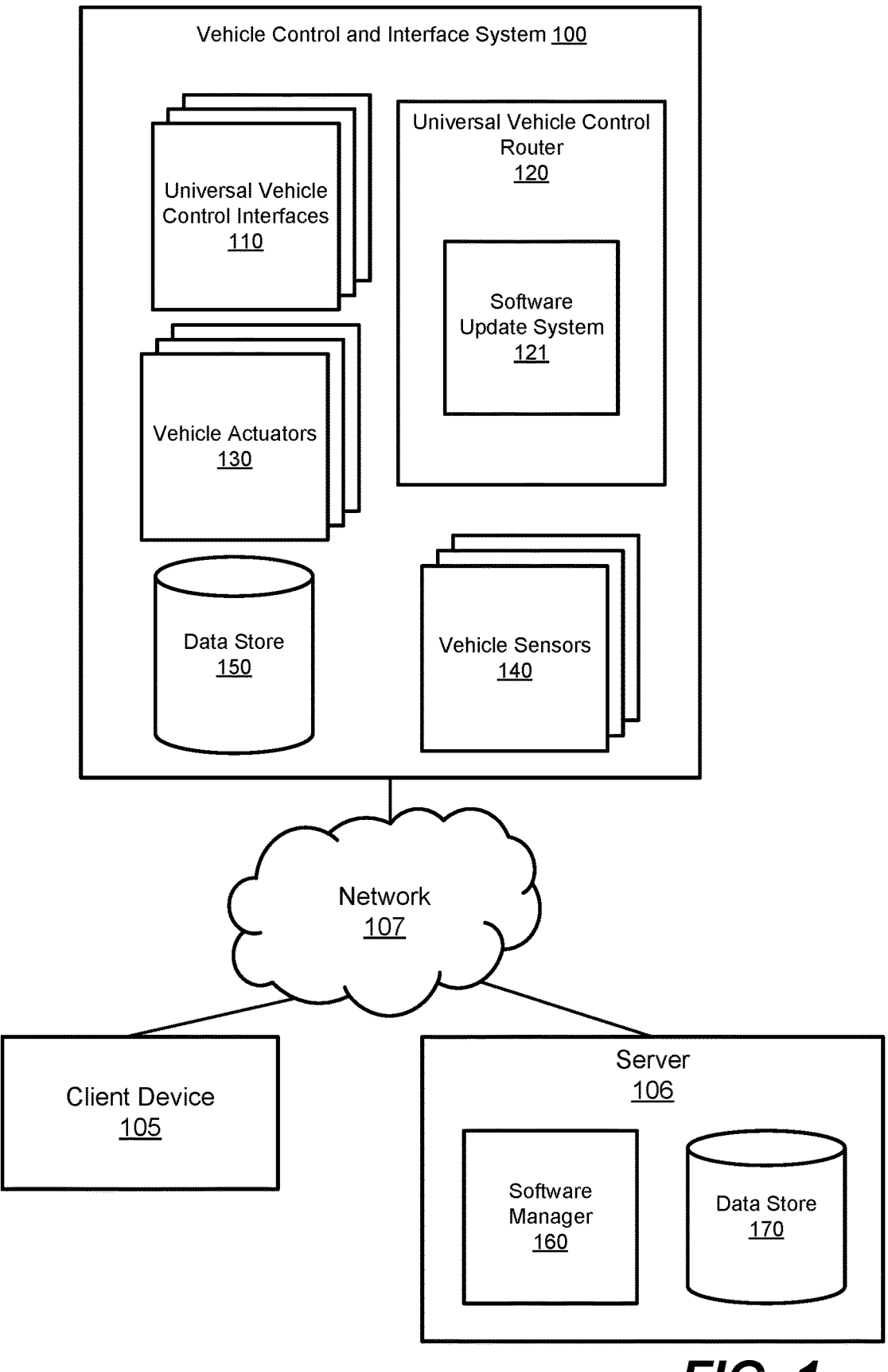
FIG. 1 is a block diagram of a vehicle control and interface system, in accordance with one or more embodiments.

The FIGURES and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A remote software update system for aerial vehicles is disclosed for securely updating software on aircrafts while maintaining safety requirements. The remote software update system may receive an indication from a companion application that an update for a display or a Flight Control Computer (FCC) assembly is available for installation. An FCC assembly may refer to a collection of two or more FCCs. An FCC assembly may also be referred to as FCCs. The remote software update system may determine if a set of requirements are met by retrieving information associated with the aircraft from the sensors of the aircraft. The remote software update system may determine whether the aircraft is suitable for performing the installation of the update. The set of requirements may include, for example, if the battery level is above a threshold, if the network connection meets a requirement (such as Long Term Evolution or Wi-Fi), or if a confirmation or approval is received from authorized user.

The remote software update system determines whether the update is for a display or an FCC assembly. In one embodiment, a display update may be an update to GUI (graphical user interface) or navigational database installed on an aircraft. The GUI may be used by a user to interact with the aerial vehicle. An FCC update may be an update to one or more FCCs of the FCC assembly or one or more motor control assembly. An FCC update may affect, e.g., how the FCCs control various servos, power management, voting system, other functions of the aircraft, or some combination thereof. If the update is for the FCC assembly, the software update system may prompt an operator or a pilot on the aircraft, through the display, to initiate the update. After receiving an approval to initiate the update, the software update system may install the update on successful completion of the download.

The software update system may monitor the status of the update. For example, if when updating the FCC assembly the update fails, then the software update system may still ensure that the flight is not interrupted, and the aircraft is still fully functional by reverting to the existing operational software. In contrast, if the update succeeds, then the software update system may send a message confirming status of the update to the display. On the other hand, if the software update system determines that the update is for the display, then the software update system may instruct the display to initiate the download of the update for the display. After the successful completion of the download, the software update system may instruct the display to automatically install the update without requesting approval from a human operator. When the installation is complete, the software update system may perform integrity checks making sure that the installation is successful. If the update fails, the software update system may send a message to the companion application and the user may send an instruction to re-initiate the remote update. If the update succeeds, the software update system may transmit (or send) a message confirming status of the update to the companion application. In some embodiments, integrity checks may involve verification of the configuration settings of the download file and 32-bit cyclic redundancy check (CRC) of the download file. In other embodiments, integrity check may involve additional encryption and decryption of the download file using any of the encryption methods such as symmetric encryption (such as advanced encryption standard (AES)), or asymmetric encryption (such as Rivest-Shamir-Adleman (RSA) encryption).

In some embodiments, a server manages software updates across one or more aircrafts in a fleet. The server may maintain a database with unique aircraft identifiers for the various aircrafts. The server, for each system of the aircraft, may log the software version presently installed in the aircraft. For aircraft with one or more outdated systems, e.g., systems with new software versions available, the server may prompt such aircraft to undergo updates.

In one or more embodiments, the server may coordinate the update and review process. For example, aircraft software updates need to be reviewed and approved by a certified reviewer (e.g., a Federal Aviation Administration (FAA) certified technician). The server may receive an update completion code from the software update system aboard the aircraft. The server may validate the update completion code. Example validations include assessing whether all appropriate CRC codes match to the update package provided to the software update system. If invalidated, the server may provide an error code to the software update system, which may be displayed on the aircraft's user interface. Depending on the system being updated, the error code may further ground the vehicle, e.g., enjoining operation of the aircraft. If validated, the server may provide a confirmation code to the software update system aboard the aircraft indicating that the software update was successfully installed. The server may provide the update log to a certified reviewer (e.g., via a client device). The reviewer may provide the result back to the server and/or to the software update system. The server may update the entry for the aircraft in the database to reflect the result, whether positive or negative. The software update system may also display the result, whether positive or negative. If the result is a positive result, indicating the software update is approved, then the aircraft may be approved for operation. If the result is a negative result, then the server may send a command to ground the vehicle and/or a prompt to reinitiate the download. The software update system may respond appropriately, e.g., grounding the vehicle and/or prompting on the user interface to reinitiate the download.

The disclosed methods and systems are technically advantageous from several perspectives. For example, the disclosed system may automate the software updating process for an aircraft control system requiring little or no interference from a human operator including both certified pilots and uncertified human operators (e.g., unskilled operators). Conventionally, a skilled maintenance technician needs to manually check the aircraft condition, manually install software updates, and sign off on the install. The proposed method allows an unskilled operator, or a pilot to perform the automated software update process using software update system. Nonetheless, the maintenance technician may also perform the updates. Further the review process may be remotely conducted, thereby improving efficiency of the updating process. The disclosed software update system automates the process and uses simple operations, such as approval or confirmation, from an operator of the aircraft. The disclosed software update system may distinguish between display update and FCC update and initiates different remote update process for each. Additionally, the disclosed software update system may also increase aircraft safety and reliability by ensuring that safety requirements and compliance requirements are met for the software updating process without a trained maintenance personnel interference. The disclosed system may query sensors of the aircraft and only install the updates if the software update system determines that the aircraft is in an appropriate condition for installing the update by checking a set of requirements including battery level and network connection. Even more, the disclosed system may increase flight safety by ensuring that the aircraft is still able to fly even if the update is not successful. The disclosed system may ensure that the aircraft can still be operated using a previous version of the software if the current installation fails.

Example System Environment

FIG. 1 illustrates an example of a vehicle control and interface system 100 connected with a client device 105 and a server 106 through a network 107, in accordance with one or more embodiments.

The network 107 represents the communication pathways between the server 106, the client device 105, and the vehicle control and interface system 100. Network 107 may be any data network, such as the Internet. The network 107 can include any combination of local area and/or wide area networks, using both wired and/or wireless communication systems. In one embodiment, the network 107 uses standard communications technologies and/or protocols. For example, the network 107 can include communication links using technologies such as Ethernet, 802.11, worldwide interoperability for microwave access (WiMAX), 3G, 4G, 5G, LTE, code division multiple access (CDMA), digital subscriber line (DSL), etc. Examples of networking protocols used for communicating via the network 107 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 107 may be represented using any suitable format, such as hypertext markup language (HTML) or extensible markup language (XML). In some embodiments, all or some of the communication links of the network 107 may be encrypted using any suitable technique or techniques.

The client device 105 comprises one or more computing devices capable of processing data as well as transmitting and receiving data via the network 107. For example, a client device 105 may be a desktop computer, a laptop computer, a smart phone, a tablet computing device, an Internet of Things (IoT) device, or any other device having computing and data communication capabilities. In one embodiment, the client device 105 may include applications for performing a particular set of functions, tasks, or activities for the benefit of the user. The client device 105 may include a companion application that may receive and perform actions that control the aircraft. For example, a user may use the companion application installed on the client device 105 to remotely approve or deny a remote update to the aircraft. In other embodiments, the client device 105 may be operated by a maintenance technician reviewing software updates by a non-technician operator.

The server 106 is a computer system configured to store, receive, and transmit data to client device 105 and the vehicle control and interface system 100 via the network 107. The server 106 may include a singular computing system, such as a single computer, or a network of computing systems, such as a data center or a distributed computing system. The server 106 may communicate with the client device 105, for example, when new updates are available to download. The server 106 may further transmit data of the updates to the vehicle control and interface system 100 if certain conditions are met. The conditions associated with when the updates are sent to the aircraft are further discussed in accordance with FIGS. 5-6.

In one or more embodiments, the server 106 coordinates software updates across one or more aircrafts in a fleet. The server 106 may comprises a software manager 160 and a data store 170.

The software manager 160 pushes software update packages to the software update system 121 of the various aircraft. The software manager 160 may also receive codes from the software update system 121 indicating status of the updates. The software manager 160 may also push out codes to the software update system 121, e.g., for display on one or more user interfaces. The codes pushed to software update system 121 may comprise commands and/or prompts that affect the vehicle control and interface system 100. For example, if a critical update fails, the software manager 160 may push a failure code to the software update system 121 with instructions to ground the aircraft, e.g., to enjoin the vehicle control and interface system 100 from operation.

The data store 170 includes a database logging the various aircrafts under management by the software manager 160. Each aircraft may correspond to one entry (or profile) in the database. The entry may uniquely identify the aircraft with a unique aircraft identifier (e.g., akin to a motor vehicle's VIN code) and statuses regarding the aircraft's various systems. For example, the entry for the aircraft logs a version of each system aboard the aircraft and/or whether the system has an outstanding update. Each system and/or update may also be tagged with a priority label. If a system and/or update is critical, then the software manager 160 may immediately prompt the software update system 121 to update that system. Critical systems and/or critical updates may also trigger grounding of the aircraft if not appropriately updated. Other priority labels may include optional or restricted. The optional priority label indicates a system and/or update that is non-critical and can be installed at the convenience of the operator. Such a priority label would not trigger grounding of the aircraft. The restricted priority label may refer to updates related to features that are restricted and only pushed out to aircraft meeting a condition. For example, the condition may be a paid feature, for military use, etc. The software manager 160 may routinely maintain the database to reflect current statuses of the aircrafts.

The vehicle control and interface system 100 may be a system coupled with an aircraft for controlling and operating the aircraft. In the example embodiment shown, the vehicle control and interface system 100 includes one or more universal vehicle control interfaces 110, a universal vehicle control router 120, one or more vehicle actuators 130, one or more vehicle sensors 140, and one or more data stores 150. In other embodiments, the vehicle control and interface system 100 may include different or additional elements. Furthermore, the functionality may be distributed among the elements in a different manner than described. The elements of FIG. 1 may include one or more computers that communicate via a network or other suitable communication method.

The vehicle control and interface system 100 may be integrated with various vehicles having different mechanical, hardware, or software components. For example, the vehicle control and interface system 100 may be integrated with fixed-wing aircraft (e.g., airplanes), rotorcraft (e.g., helicopters), motor vehicles (e.g., automobiles), watercraft (e.g., power boats or submarines), or any other suitable vehicle. The vehicle control and interface system 100 is advantageously configured to receive inputs for requested operation of a particular vehicle via universal set of interfaces and the inputs to appropriate instructions for mechanical, hardware, or software components of the particular vehicle to achieve the requested operation. In doing so, the vehicle control and interface system 100 enables human operators to operate different vehicles using the same universal set of interfaces or inputs. By way of example, "universal" indicates that a feature of the vehicle control and interface system 100 may operate or be architected in a vehicle-agnostic manner. This allows for vehicle integration without necessarily having to design and configure vehicle specific customizations or reconfigurations in order to integrate the specific feature. Although universal features of the vehicle control and interface system 100 can function in a vehicle-agnostic manner, the universal features may still be configured for particular contexts. For example, the vehicle control or interface system 100 may receive or process inputs describing three-dimensional movements for vehicles that can move in three dimensions (e.g., aircraft) and conversely may receive or process inputs describing two-dimensional movements for vehicles that can move in two dimensions (e.g., automobiles). One skilled in the art will appreciate that other context-dependent configurations of universal features of the vehicle control and interface system 100 are possible.

The universal vehicle control interfaces 110 is a set of universal interfaces configured to receive a set of universal vehicle control inputs to the vehicle control and interface system 100. The universal vehicle control interfaces 110 may include one or more digital user interfaces presented to an operator of a vehicle via one or more electronic displays. In one embodiment, a human operator may enter instructions, receive messages, or review information through the electronic displays. In some embodiments, the universal vehicle control interfaces 110 may be referred to as the displays. The displays may be installed with software for the displays performing operations and executing specific tasks. At some point, the software may become outdated as updates become available. The universal vehicle control interfaces 110 may receive instructions from the software update system 121 for updating the displays remotely.

The universal vehicle control interfaces 110 may include a mechanical controller (e.g., mechanical sidestick) enabling four-axis control of a vehicle and provide independent force feel mechanisms in movement axes and redundancy measures for increased safety. Additionally, the universal vehicle control interfaces 110 may include one or more controllers such as side sticks, center sticks, throttles, cyclic controllers, or collective controllers. The universal vehicle control interfaces 110 receive universal vehicle control inputs requesting operation of a vehicle. In particular, the inputs received by the universal vehicle control interfaces 110 may describe a requested trajectory of the vehicle, such as to change a velocity of the vehicle in one or more dimensions or to change an orientation of the vehicle. Because the universal vehicle control inputs describe an intended trajectory of a vehicle directly rather than describing vehicle-specific precursor values for achieving the intended trajectory, such as vehicle attitude inputs (e.g., power, lift, pitch, roll yaw), the universal vehicle control inputs can be used to universally describe a trajectory of any vehicle. This is in contrast to existing systems where control inputs are received as vehicle-specific trajectory precursor values that are specific to the particular vehicle. Advantageously, any individual interface of the set of universal vehicle control interfaces 110 configured to received universal vehicle control inputs can be used to completely control a trajectory of a vehicle. This is in contrast to conventional systems, where vehicle trajectory must be controlled using two or more interfaces or inceptors that correspond to different axes of movement or vehicle actuators. For instance, conventional rotorcraft systems include different cyclic (controlling pitch and roll), collective (controlling heave), and pedal (controlling yaw) inceptors. Similarly, conventional fixed-wing aircraft systems include different stick or yoke (controlling pitch and role), power (controlling forward movement), and pedal (controlling yaw) inceptors.

In various embodiments, inputs received by the universal vehicle control interfaces 110 can include "steady-hold" inputs, which may be configured to hold a parameter value fixed (e.g., remain in a departed position) without a continuous operator input. Such variants can enable hands-free operation, where discontinuous or discrete inputs can result in a fixed or continuous input. In a specific example, a user of the universal vehicle control interfaces 110 can provide an input (e.g., a speed input) and subsequently remove their hands with the input remaining fixed. Alternatively, or additionally, inputs received by the universal vehicle control interfaces 110 can include one or more self-centering or automatic return inputs, which return to a default state without a continuous user input.

In some embodiments, the universal vehicle control interfaces 110 include interfaces that provide feedback information to an operator of the vehicle. For instance, the universal vehicle control interfaces 110 may provide information describing a state of a vehicle integrated with the universal vehicle control interfaces 110 (e.g., current vehicle speed, direction, orientation, location, etc.). Additionally, or alternatively, the universal vehicle control interfaces 110 may provide information to facilitate navigation or other operations of a vehicle, such as visualizations of maps, terrain, or other environmental features around the vehicle.

The universal vehicle control router 120 routes universal vehicle control inputs describing operation of a vehicle to components of the vehicle suitable for executing the operation. In particular, the universal vehicle control router 120 receives universal vehicle control inputs describing the operation of the vehicle, processes the inputs using information describing characteristics of the aircraft, and outputs a corresponding set of commands for actuators of the vehicle (e.g., the vehicle actuators 130) suitable to achieve the operation. The universal vehicle control router 120 may use various information describing characteristics of a vehicle in order to convert universal vehicle control inputs to a suitable set of commands for actuators of the vehicle. Additionally, or alternatively, the universal vehicle control router 120 may convert universal vehicle control inputs to a set of actuator commands using a set of control laws that enforce constraints (e.g., limits) on operations requested by the universal control inputs. For example, the set of control laws may include velocity limits (e.g., to prevent stalling in fixed-wing aircraft), acceleration limits, turning rate limits, engine power limits, rotor revolution per minute (RPM) limits, load power limits, allowable descent altitude limits, etc. After determining a set of actuator commands, the universal vehicle control router 120 may transmit the commands to relevant components of the vehicle for causing corresponding actuators to execute the commands.

The universal vehicle control router 120 can decouple axes of movement for a vehicle in order to process received universal vehicle control inputs. In particular, the universal vehicle control router 120 can process a received universal vehicle control input for one axis of movement without impacting other axes of movement such that the other axes of movement remain constant. In this way, the universal vehicle control router 120 can facilitate "steady-hold" vehicle control inputs, as described above with reference to the universal vehicle control interfaces 110. This is in contrast to conventional systems, where a vehicle operator must manually coordinate all axes of movement independently for a vehicle in order to produce movement in one axis (e.g., a pure turn, a pure altitude climb, a pure forward acceleration, etc.) without affecting the other axes of movement.

In some embodiments, the universal vehicle control router 120 is configured to use one or more models corresponding to a particular vehicle to convert universal vehicle control inputs to a suitable set of commands for actuators of the vehicle. For example, a model may include a set of parameters (e.g., numerical values) that can be used as input to universal input conversion processes in order to generate actuator commands suitable for a particular vehicle. In this way, the universal vehicle control router 120 can be integrated with vehicles by substituting models used by processes of the universal vehicle control router 120, enabling efficient integration of the vehicle control and interface system 100 with different vehicles. The one or more models may be obtained by the universal vehicle control router 120 from a vehicle model database or other first-party or third-party system, e.g., via a network. In some cases, the one or more models may be static after integration with the vehicle control and interface system 100, such as if a vehicle integrated with the vehicle control and interface system 100 receives is certified for operation by a certifying authority (e.g., the United States Federal Aviation Administration). In some embodiments, parameters of the one or more models are determined by measuring data during real or simulated operation of a corresponding vehicle and fitting the measured data to the one or more models.

In some embodiments, the universal vehicle control router 120 processes universal vehicle control inputs according to a current phase of operation of the vehicle. For instance, if the vehicle is a rotorcraft, the universal vehicle control router 120 may convert a universal input describing an increase in lateral speed to one or more actuator commands differently if the rotorcraft is in a hover phase or in a forward flight phase. In particular, in processing the lateral speed increase universal input the universal vehicle control router 120 may generate actuator commands causing the rotorcraft to strafe if the rotorcraft is hovering and causing the rotorcraft to turn if the rotorcraft is in forward flight. As another example, in processing a turn speed increase universal input the universal vehicle control router 120 may generate actuator commands causing the rotorcraft to perform a pedal turn if the rotorcraft is hovering and ignore the turn speed increase universal input if the rotorcraft is in another phase of operation. As a similar example for a fixed-wing aircraft, in processing a turn speed increase universal input the universal vehicle control router 120 may generate actuator commands causing the fixed-wing aircraft to perform tight ground turn if the fixed-wing aircraft is grounded and ignore the turn speed increase universal input if the fixed-wing aircraft is in another phase of operation. One skilled in the art will appreciate that the universal vehicle control router 120 may perform other suitable processing of universal vehicle control inputs to generate actuator commands in consideration of vehicle operation phases for various vehicles.

The universal vehicle control router 120 may include a software update system 121 that manages software updating process for the aircraft. Responsive to receiving an indication from a companion application that an update for a display or a Flight Control Computer (FCC) is available for installation, the software update system may determine if a set of requirements are met by retrieving information associated with the aircraft from the sensors of the aircraft. The software update system may determine whether the aircraft is suitable for performing the installation of the update. The software update system may further determine if the update is for a display or an FCC and perform a different remote update process for each type of update correspondingly. The software update system 121 may communicate with the server 106, e.g., the software manager 160, at various points throughout the update process. The software update system 121 is further discussed in accordance with FIGS. 4-8.

The vehicle actuators 130 are one or more actuators configured to control components of a vehicle integrated with the universal vehicle control interfaces 110. For instance, the vehicle actuators may include actuators for controlling a power-plant of the vehicle (e.g., an engine). Furthermore, the vehicle actuators 130 may vary depending on the particular vehicle. For example, if the vehicle is a rotorcraft the vehicle actuators 130 may include actuators for controlling lateral cyclic, longitudinal cyclic, collective, and pedal controllers of the rotorcraft. As another example, if the vehicle is a fixed-wing aircraft the vehicle actuators 130 may include actuators for controlling a rudder, elevator, ailerons, and power-plant of the fixed-wing aircraft.

The vehicle sensors 140 are sensors configured to capture corresponding sensor data. In various embodiments the vehicle sensors 140 may include, for example, one or more global positioning system (GPS) receivers, inertial measurement units (IMUs), accelerometers, gyroscopes, magnetometers, pressure sensors (altimeters, static tubes, pitot tubes, etc.), temperature sensors, vane sensors, range sensors (e.g., laser altimeters, radar altimeters, lidars, radars, ultrasonic range sensors, etc.), terrain elevation data, geographic data, airport or landing zone data, rotor revolutions per minute (RPM) sensors, manifold pressure sensors, or other suitable sensors. In some cases the vehicle sensors 140 may include, for example, redundant sensor channels for some or all of the vehicle sensors 140. The vehicle control and interface system 100 may use data captured by the vehicle sensors 140 for various processes.

The data store 150 is a database storing various data for the vehicle control and interface system 100. For instance, the data store 150 may store sensor data (e.g., captured by the vehicle sensors 140), vehicle models, vehicle metadata, or any other suitable data. The data store 150 may also store downloaded software updates received from the server 106 over the network 107.

Figure 2:
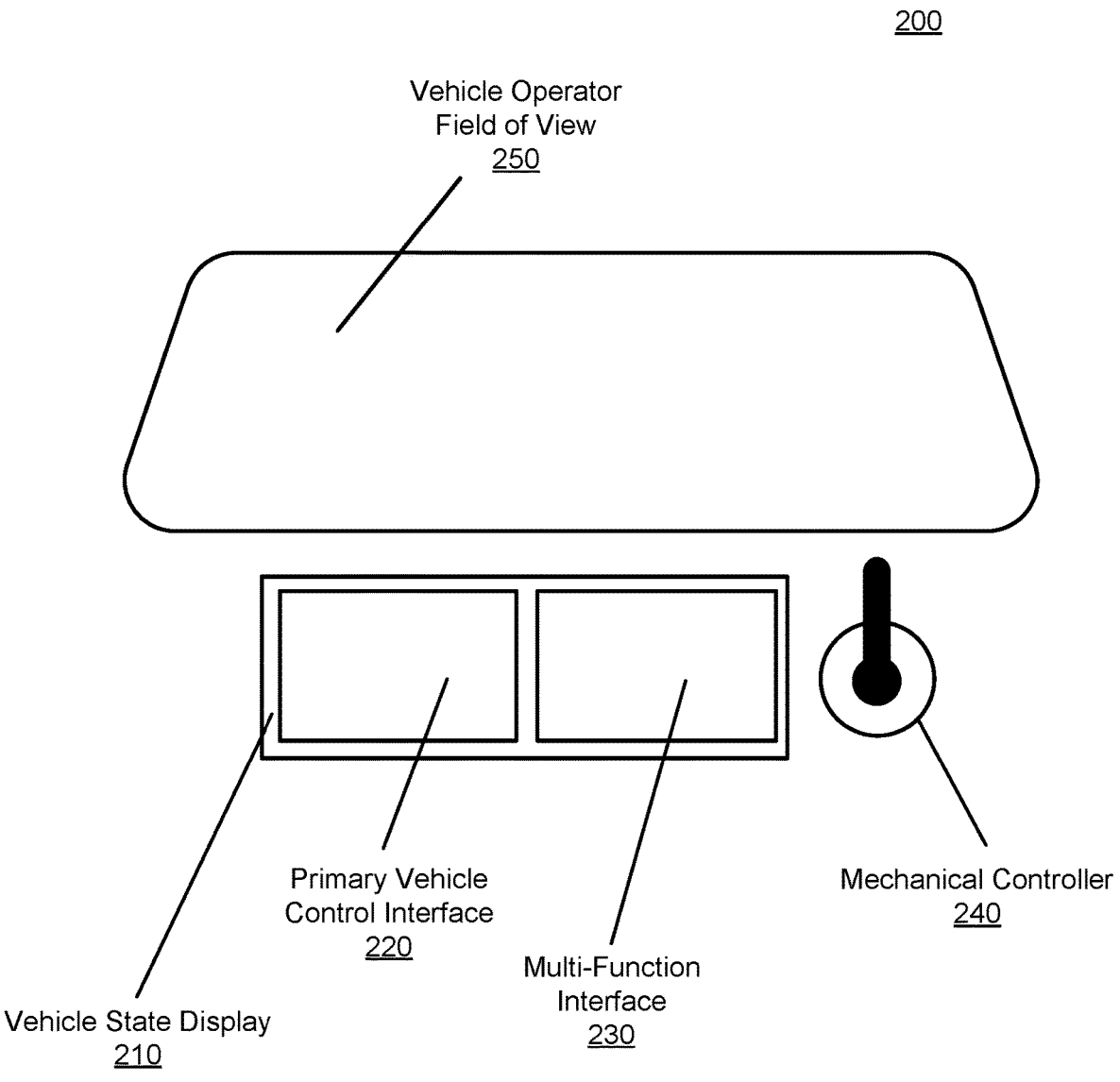
FIG. 2 depicts a configuration for a set of universal vehicle control interfaces in a vehicle, in accordance with one or more embodiments.

FIG. 2 illustrates an example configuration 200 for a set of universal vehicle control interfaces in a vehicle, in accordance with one or more embodiments. The vehicle control interfaces in the configuration 200 may be embodiments of the universal vehicle control interfaces 110, as described above with reference to FIG. 1. In the embodiment shown, the configuration 200 includes a vehicle state display 210, a mechanical controller 240, and a vehicle operator field of view 250. In other embodiments, the configuration 200 may include different or additional elements. Furthermore, the functionality may be distributed among the elements in a different manner than described.

The vehicle state display 210 is one or more electronic displays (e.g., liquid-crystal displays (LCDs) configured to display or receive information describing a state of the vehicle including the configuration 200. In particular, the vehicle state display 210 may display various interfaces including feedback information for an operator of the vehicle. In this case, the vehicle state display 210 may provide feedback information to the operator in the form of virtual maps, 3D terrain visualizations (e.g., wireframe, rendering, environment skin, etc.), traffic, weather, engine status, communication data (e.g., air traffic control (ATC) communication), guidance information (e.g., guidance parameters, trajectory), and any other pertinent information. Additionally, or alternatively, the vehicle state display 210 may display various interfaces for configuring or executing automated vehicle control processes, such as automated aircraft landing or takeoff or navigation to a target location. The vehicle state display 210 may receive user inputs via various mechanisms, such as gesture inputs (as described above with reference to the gesture interface 220), audio inputs, or any other suitable input mechanism.

As depicted in FIG. 2 the vehicle state display 210 includes a primary vehicle control interface 220 and a multi-function interface 230. The primary vehicle control interface 220 is configured to facilitate short-term state of the vehicle including the configuration 200. In particular, the primary vehicle control interface 220 includes information immediately relevant to control of the vehicle, such as current universal control input values or a current state of the vehicle. As an example, the primary vehicle control interface 220 may include a virtual object representing the vehicle in 3D or 2D space. In this case, the primary vehicle control interface 220 may adjust the display of the virtual object responsive to operations performed by the vehicle in order to provide an operator of the vehicle with visual feedback. The primary vehicle control interface 220 may additionally, or alternatively, receive universal vehicle control inputs via gesture inputs.

The multi-function interface 230 is configured to facilitate long-term control of the vehicle including the configuration 200. In particular, the primary vehicle control interface 220 may include information describing a mission for the vehicle (e.g., navigation to a target destination) or information describing the vehicle systems. Information describing the mission may include routing information, mapping information, or other suitable information. Information describing the vehicle systems may include engine health status, engine power utilization, fuel, lights, vehicle environment, or other suitable information. In some embodiments, the multi-function interface 230 or other interfaces enable mission planning for operation of a vehicle. For example, the multi-function interface 230 may enable configuring missions for navigating a vehicle from a start location to a target location. In some cases, the multi-function interface 230 or another interface provides access to a marketplace of applications and services. The multi-function interface 230 may also include a map, a radio tuner, or a variety of other controls and system functions for the vehicle.

In some embodiments, the vehicle state display 210 includes information describing a current state of the vehicle relative to one or more control limits of the vehicle (e.g., on the primary vehicle control interface 220 or the multi-function interface 230). For example, the information may describe power limits of the vehicle or include information indicating how much control authority has across each axis of movement for the vehicle (e.g., available speed, turning ability, climb or descent ability for an aircraft, etc.). In the same or different example embodiment, the vehicle state display 210 may display different information depending on a level of experience of a human operator of the vehicle. For instance, if the vehicle is an aircraft and the human operator is new to flying, the vehicle state display may include information indicating a difficulty rating for available flight paths (e.g., beginner, intermediate, or expert). The particular experience level determined for an operator may be based upon prior data collected and analyzed about the human operator corresponding to their prior experiences in flying with flight paths having similar expected parameters. Additionally, or alternatively, flight path difficulty ratings for available flight paths provided to the human operator may be determined based on various information, for example, expected traffic, terrain fluctuations, airspace traffic and traffic type, how many airspaces and air traffic controllers along the way, or various other factors or variables that are projected for a particular flight path. Moreover, the data collected from execution of this flight path can be fed back into the database and applied to a machine learning model to generate additional and/or refined ratings data for the operator for subsequent application to other flight paths. Vehicle operations may further be filtered according to which one is the fastest, the most fuel efficient, or the most scenic, etc.

The one or more vehicle state displays 210 may include one or more electronic displays (e.g., liquid-crystal displays (LCDs), organic light emitting diodes (OLED), plasma). For example, the vehicle state display 210 may include a first electronic display for the primary vehicle control interface 220 and a second electronic display for the multi-function interface 230. In cases where the vehicle state display 210 include multiple electronic displays, the vehicle state display 210 may be configured to adjust interfaces displayed using the multiple electronic displays, e.g., in response to failure of one of the electronic displays. For example, if an electronic display rendering the primary vehicle control interface 220 fails, the vehicle state display 210 may display some or all of the primary vehicle control interface 220 on another electronic display.

The one or more electronic displays of the vehicle state display 210 may be touch sensitive displays is configured to receive touch inputs from an operator of the vehicle including the configuration 200, such as a multi-touch display. For instance, the primary vehicle control interface 220 may be a gesture interface configured to receive universal vehicle control inputs for controlling the vehicle including the configuration 200 via touch gesture inputs. In some cases, the one or more electronic displays may receive inputs via other type of gestures, such as gestures received via an optical mouse, roller wheel, three-dimensional (3D) mouse, motion tracking device (e.g., optical tracking), or any other suitable device for receiving gesture inputs.

Touch gesture inputs received by one or more electronic displays of the vehicle state display 210 may include single finger gestures (e.g., executing a predetermined pattern, swipe, slide, etc.), multi-finger gestures (e.g., 2, 3, 4, 5 fingers, but also palm, multi-hand, including/excluding thumb, etc.; same or different motion as single finger gestures), pattern gestures (e.g., circle, twist, convergence, divergence, multi-finger bifurcating swipe, etc.), or any other suitable gesture inputs. Gesture inputs can be limited asynchronous inputs (e.g., single input at a time) or can allow for multiple concurrent or synchronous inputs. In variants, gesture input axes can be fully decoupled or independent. In a specific example, requesting a speed change holds other universal vehicle control input parameters fixed—where vehicle control can be automatically adjusted in order to implement the speed change while holding heading and vertical rate fixed. Alternatively, gesture axes can include one or more mutual dependencies with other control axes. Unlike conventional vehicle control systems, such as aircraft control systems, the gesture input configuration as disclosed provides for more intuitive user experiences with respect to an interface to control vehicle movement.

In some embodiments, the vehicle state display 220 or other interfaces are configured to adjust in response to vehicle operation events, such as emergency conditions. For instance, in response to determining the vehicle is in an emergency condition, the vehicle control and interface system 100 may adjust the vehicle state display 210 to include essential information or remove irrelevant information. As an example, if the vehicle is an aircraft and the vehicle control and interface system 100 detects an engine failure for the aircraft, the vehicle control and interface system 100 may display essential information on the vehicle state display 210 including 1) a direction of the wind, 2) an available glide range for the aircraft (e.g., a distance that the aircraft can glide given current conditions), or 3) available emergency landing spots within the glide range. The vehicle control and interface system 100 may identify emergency landing locations using various processes, such as by accessing a database of landing spots (e.g., included in the data store 150 or a remote database) or ranking landing spots according to their suitability for an emergency landing.

The mechanical controller 240 may be configured to receive universal vehicle control inputs. In particular, the mechanical controller 240 may be configured to receive the same or similar universal vehicle control inputs as a gesture interface of the vehicle state display 210 is configured to receive. In this case, the gesture interface and the mechanical controller 240 may provide redundant or semi-redundant interfaces to a human operator for providing universal vehicle control inputs. The mechanical controller 240 may be active or passive. Additionally, the mechanical controller 240 and may include force feedback mechanisms along any suitable axis.

The components of the configuration 200 may be integrated with the vehicle including the configuration 200 using various mechanical or electrical components. These components may enable adjustment of one or more interfaces of the configuration 200 for operation by a human operator of the vehicle. For example, these components may enable rotation or translation of the vehicle state display 230 toward or away from a position of the human operator (e.g., a seat where the human operator sits). Such adjustment may be intended, for example, to prevent the interfaces of the configuration 200 from obscuring a line of sight of the human operator to the vehicle operator field of view 250.

The vehicle operator field of view 250 is a first-person field of view of the human operator of the vehicle including the configuration 200. For example, the vehicle operator field of view 250 may be a windshield of the vehicle or other suitable device for enabling a first-person view for a human operator.

The configuration 200 additionally or alternately include other auxiliary feedback mechanisms, which can be auditory (e.g., alarms, buzzers, etc.), haptic (e.g., shakers, haptic alert mechanisms, etc.), visual (e.g., lights, display cues, etc.), or any other suitable feedback components. Furthermore, displays of the configuration 200 (e.g., the vehicle state display 210) can simultaneously or asynchronously function as one or more of different types of interfaces, such as an interface for receiving vehicle control inputs, an interface for displaying navigation information, an interface for providing alerts or notifications to an operator of the vehicle, or any other suitable vehicle instrumentation. Furthermore, portions of the information can be shared between multiple displays or configurable between multiple displays.

Example Vehicle Control Router with Redundant Flight Control Computers

Figure 3:
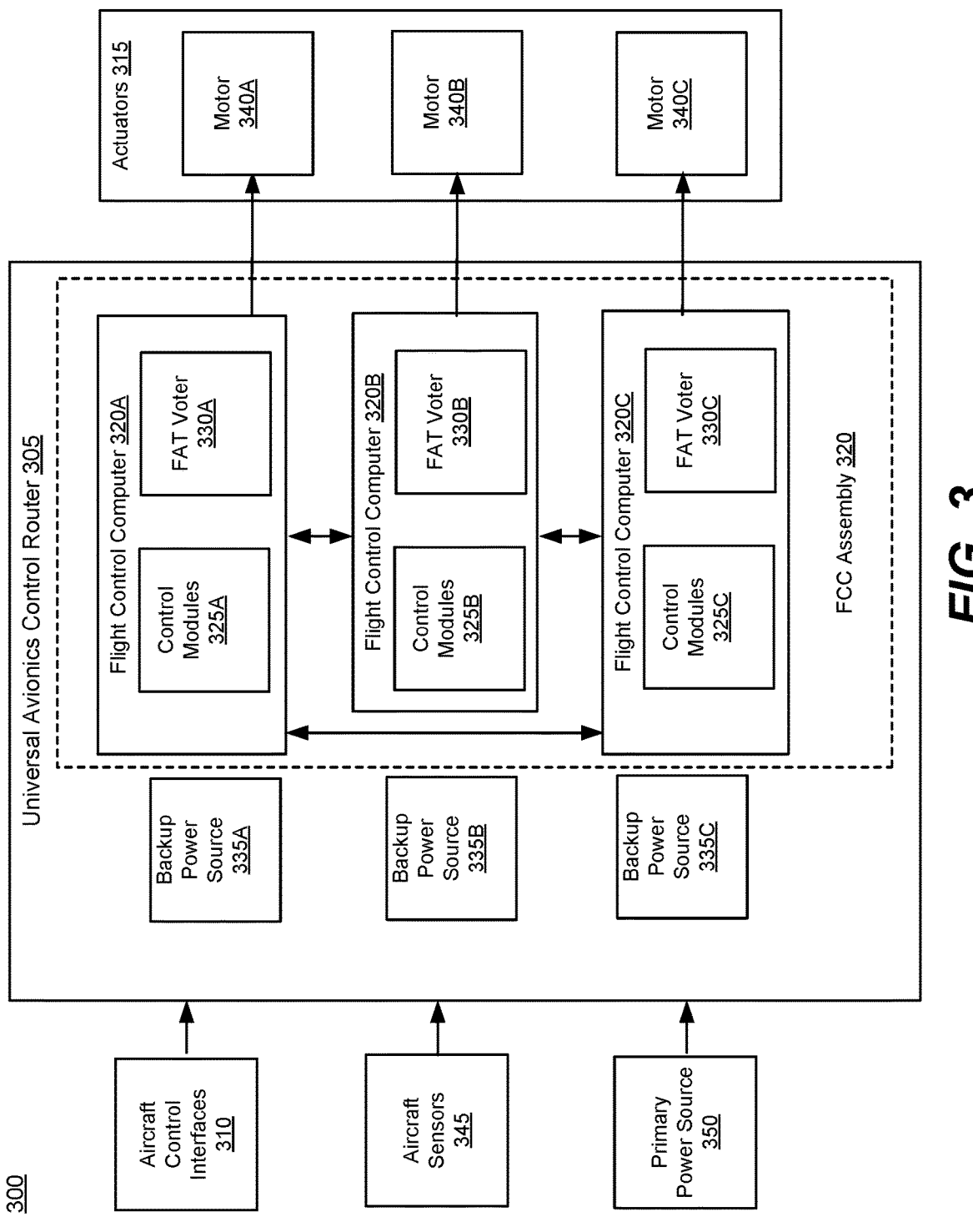
FIG. 3 illustrates an example configuration for a set of flight control computers in a vehicle, in accordance with one or more embodiments.

FIG. 3 illustrates an embodiment of a schematic diagram 300 for a universal avionics control router 305 in a redundant configuration, in accordance with one or more embodiments. The universal avionics control router 305 may be an embodiment of the universal vehicle control router 120. Although the embodiment depicted in FIG. 3 is particularly directed to operating an aircraft (e.g., a rotorcraft or fixed wing aircraft), one skilled in the art will appreciate that similar systems can be used with other vehicles, such as motor vehicles or watercraft.

Aircraft control interfaces 310 are configured to provide universal aircraft control inputs to the universal avionics control router 305. The aircraft control interfaces 310 may be embodiments of the universal vehicle control interfaces 110. In particular, the aircraft control interfaces 310 may include an inceptor device, a gesture interface, and an automated control interface. The aircraft control interfaces 310 may be configured to receive instructions from a human pilot as well as instructions from an autopilot system and convert the instructions into universal aircraft control inputs to the universal avionics control router 305. At a given time, the universal aircraft control inputs may include inputs received from some or all of the aircraft control interfaces 310. Inputs received from the aircraft control interfaces 310 are routed to the universal avionics control router 305. The aircraft control interfaces 310 may generate multiple sets of signals, such as one set of signals for each flight control channel via separate wire harnesses and connectors. Inputs received by the aircraft control interfaces 310 may include information for selecting or configuring automated control processes, such as automated aircraft control macros (e.g., macros for aircraft takeoff, landing, or autopilot) or automated mission control (e.g., navigating an aircraft to a target location in the air or ground).

The universal avionics control router 305 is configured to convert the inputs received from the aircraft control interfaces 310 into instructions to an actuator 315 configured to move an aircraft component. The universal avionics control router 305 comprises a plurality of flight control computers 320A, 320B, 320C (collectively the FCC assembly 320). Each flight control computer 320 comprises a plurality of control modules 325A, 325B, 325C (Collectively 325), a Fully Analyzable and Testable (FAT) voter 330A, 330B, 330C (Collectively 330), and one or more processors (not shown). Each flight control computer 320 is associated with a backup power source 335A, 335B, 335C (Collectively 335) configured to provide power to the associated flight control computer 320. In the illustrated embodiment, the universal avionics flight control router 305 comprises three flight control computers 320. However, in other embodiments, the universal avionics control router 305 may comprise two, four, five, or any other suitable number of flight control computers 320.

Each flight control computer 320 is configured to receive inputs from the aircraft control interfaces 310 and provide instructions to actuators 315 configured to move aircraft components in a redundant configuration. Each flight control computer 320 operates in an independent channel from the other flight control computer 320. Each independent channel comprises distinct dedicated components, such as wiring, cabling, servo motors, etc., that is separate from the components of the other independent channels. The independent channel includes the plurality of motors 340 to which the flight control computer provides commands. One or more components of each flight control computer 320 may be manufactured by a different manufacturer, be a different model, or some combination thereof, to prevent a design instability from being replicated across flight control computers 320. For example, in the event that a chip in a processor is susceptible to failure in response to a particular sequence of inputs, having different chips in the processors of the other flight control computers 320 may prevent simultaneous failure of all flight control computers in response to encountering that particular sequence of inputs.

Each flight control computer 320 comprises a plurality of control modules 325 configured to convert inputs from the aircraft control interfaces 310 and aircraft sensors 345 into actuator instructions. The control modules may comprise an automated aircraft control module, an aircraft state estimation module, a sensor validation module, a command processing module, and a control laws module. The automated aircraft control module may be configured to generate a set of universal aircraft control inputs suitable for executing automated control processes. The aircraft state estimation module may be configured to determine an estimated aircraft state of the aircraft using validated sensor signals, such as an estimated 3D position of the vehicle with respect to the center of the Earth, estimated 3D velocities of the aircraft with respect to the ground or with respect to a moving air mass, an estimated 3D orientation of the aircraft, estimated 3D angular rates of change of the aircraft, an estimated altitude of the aircraft, or any other suitable information describing a current state of the aircraft. The sensor validation module is configured to validate sensor signals captured by the aircraft sensors 345. For example, the sensors may be embodiments of the vehicle sensors 140 described above with reference to FIG. 1. The command processing module is configured to generate aircraft trajectory values using the universal aircraft control inputs. The aircraft trajectory values describe universal rates of change of the aircraft along movement axes of the aircraft in one or more dimensions.

The control laws module is configured to generate the actuator commands (or signals) using the aircraft position values. The control laws module includes an outer processing loop and an inner processing loop. The outer processing loop applies a set of control laws to the received aircraft position values to convert aircraft position values to corresponding allowable aircraft position values. Conversely, the inner processing loop converts the allowable aircraft position values to the actuator commands configured to operate the aircraft to achieve the allowable aircraft position values. Both the outer processing loop and the inner processing loop are configured to operate independently of the particular aircraft including the universal avionics control router 305. In order to operate independently in this manner, the inner and outer processing loops may use a model including parameters describing characteristics of the aircraft that can be used as input to processes or steps of the outer and inner processing loops. The control laws module may use the actuator commands to directly control corresponding actuators, or may provide the actuator commands to one or more other components of the aircraft to be used to operate the corresponding actuators.

The FAT voters 330 are configured to work together to determine which channels should be prevented from controlling the downstream functions, such as control of an actuator 315. Each FAT voter 330 comprises a channel enable logic configured to determine whether that channel should remain active. In response to a FAT voter 330 determining that its associated flight control computer 320 is malfunctioning during a self-assessment routine, the FAT voter 330 may disconnect the flight control computer 320 from the motors 340 in its channel, thus disconnecting the flight control computer 320 from all actuators 315. The self-assessment is performed in the processor of the flight control computer 320 based on high assurance software. The self-assessment routine assumes that the processor is in good working order. Each flight control computer 320 evaluates the signal output by the other channels to determine whether the other channels should be deactivated. Each flight control computer 320 compares the other flight control computers' 320 control commands to the downstream functions as well as other signals contained in the cross-channel data link to its own. Each flight control computer 320 may be connected to the other flight control computers 320 via a cross-channel data link. The flight control computer 320 executes a failure detection algorithm to determine the sanity of the other flight control computers 320. In response to other flight control computers 320 determining that a flight control computer 320 is malfunctioning, the FAT voter 330 for the malfunctioning flight control computer 320 may disconnect the malfunctioning flight control computer 320 from the motors 340 in its channel. In some embodiments, the FAT voter 330 may disconnect power to the malfunctioning flight control computer 320.

The backup power sources 335 are configured to provide power to the flight control computers 320 and motors 340 in the event of a disruption of power from a primary power source 350. The backup power source 335 may comprise a battery, an auxiliary generator, a flywheel, an ultra-cap, some other power source, or some combination thereof. The backup power source 335 may be rechargeable, but can alternately be a single use, and/or have any suitable cell chemistry (e.g., Li-ion, Ni-cadmium, lead-acid, alkaline, etc.). The backup power source is sufficiently sized to concurrently power all flight components necessary to provide aircraft control authority and or sustain flight (e.g., alone or in conjunction with other backup power sources). The backup power source 335 may be sized to have sufficient energy capacity to enable a controlled landing, power the aircraft for a at least a predetermined time period (e.g., 10 minutes, 20 minutes, 30 minutes, etc.), or some combination thereof. In some embodiments, the backup power source 335 can power the flight control computer 320, aircraft sensors 345, and the motors 340 for the predetermined time period.

The backup power sources 335 can include any suitable connections. In some embodiments, each backup power source 335 may supply power to a single channel. In some embodiments, power can be supplied by a backup power source 335 over multiple channels, shared power connection with other backup power systems 335, and/or otherwise suitably connected. In some embodiments, the backup power sources 335 can be connected in series between the primary power source 350 and the flight control computer 320. In some embodiments, the backup power source 335 can be connected to the primary power source 350 during normal operation and selectively connected to the flight control computer 320 during satisfaction of a power failure condition. In some embodiments, the backup power source 335 can be connected in parallel with the primary power source 350. However, the backup power source can be otherwise suitably connected.

The backup power sources 335 may be maintained at substantially full state of charge (SoC) during normal flight (e.g., 100% SoC, SoC above a predetermined threshold charge), however can be otherwise suitably operated. In some embodiments, the backup power sources 335 draw powers from the primary power source 350 during normal flight, may be pre-charged (or installed with a full charge) before flight initiation, or some combination thereof. The backup power sources 335 may employ load balancing to maintain a uniform charge distribution between backup power sources 335, which may maximize a duration of sustained, redundant power. Load balancing may occur during normal operation (e.g., before satisfaction of a power failure condition), such as while the batteries are drawing power from the primary power source 350, during discharge, or some combination thereof.

Backup power may be employed in response to satisfaction of a power failure condition. A power failure condition may include: failure to power the actuator from aircraft power (e.g., main power source, secondary backup systems such as ram air turbines, etc.), electrical failure (e.g., electrical disconnection of UACR from primary power bus, power cable failure, blowing a fuse, etc.), primary power source 350 (e.g., generator, alternator, engine, etc.) failure, power connection failure to one or more flight components (e.g., actuators, processors, drivers, sensors, batteries, etc.), fuel depletion below a threshold (e.g., fuel level is substantially zero), some other suitable power failure condition, or some combination thereof. In some embodiments, a power failure condition can be satisfied by a manual input (e.g., indicating desired use of backup power, indicating a power failure or other electrical issue).

The motors 340A, 340B, 340C (Collectively 340) are configured to move an actuator 315 to modify the position of an aircraft component. Motors 340 may include rotary actuators (e.g., motor, servo, etc.), linear actuators (e.g., solenoids, solenoid valves, etc.), hydraulic actuators, pneumatic actuators, any other suitable motors, or some combination thereof. In some embodiments, an actuator 315 may comprise one motor 340 and associated electronics in each channel corresponding to each flight control computer 320. For example, the illustrated actuator 315 comprises three motors 340, each motor 340 associated with a respective flight control computer 320. In some embodiments, an actuator 315 may comprise a single motor 340 that comprises an input signal from each channel corresponding to each flight control computer 320. Each flight control computer 320 may be capable of controlling all actuators 315 by controlling all motors 340 within that channel.

The actuators 315 may be configured to manipulate control surfaces to affect aerodynamic forces on the aircraft to execute flight control. The actuators 315 may be configured to replace manual control to components, include the power-plant, flaps, brakes, etc. In some embodiments, actuators 315 may comprise electromagnetic actuators (EMAs), hydraulic actuators, pneumatic actuators, any other suitable actuators, or some combination thereof. Actuators 315 may directly or indirectly manipulate control surfaces. Control surfaces may include rotary control surfaces (e.g., rotor blades), linear control surfaces, wing flaps, elevators, rudders, ailerons, any other suitable control surfaces, or some combination thereof. In some embodiments, actuators 315 can manipulate a swashplate (or linkages therein), blade pitch angle, rotor cyclic, elevator position, rudder position, aileron position, tail rotor RPM, any other suitable parameters, or some combination thereof. In some embodiments, actuators 315 may include devices configured to power primary rotor actuation about the rotor axis (e.g., in a helicopter).

The motors 340 may be electrically connected to any suitable number of backup power sources via the harness. The motors 340 can be connected to a single backup power source, subset of backup power sources, and/or each backup power source. In normal operation, each motor 340 in each channel may be powered by the flight control computer 320 in that channel. The motors 340 may be wired in any suitable combination/permutation of series/parallel to each unique power source in each channel. The motors 340 may be indirectly electrically connected to the primary power source 350 via the backup power source (e.g., with the backup power source connected in series between the motor 340 and primary power source 350), but can alternatively be directly electrically connected to the primary power source 350 (e.g., separate from, or the same as, that powering the backup power source). The flight control computer 320 in each channel independently powers and provides signals to each channel.

The various components may be connected by a harness, which functions to electrically connect various endpoints (e.g., modules, actuators, primary power sources, human machine interface, external sensors, etc.) on the aircraft. The harness may include any suitable number of connections between any suitable endpoints. The harness may include a single (electrical) connector between the harness and each module, a plurality of connectors between each harness and each module, or some combination thereof. In some embodiments, the harness includes a primary power (e.g., power in) and a flight actuator connection (e.g., power out) to each module. In some embodiments, the harness can include separate power and data connections, but these can alternately be shared (e.g., common cable/connector) between various endpoints. The harness may comprise inter-module connections between each module and a remainder of the modules.

The harness may comprise intra-module electrical infrastructure (e.g., within the housing), inter-module connections, connections between modules and sensors (e.g., magnetometers, external air data sensors, GPS antenna, etc.), connections between modules and the human machine interface, and/or any other suitable connections. Intra-module connections can, in variants, have fewer protections (e.g., EMI protections, environmental, etc.) because they are contained within the housing. In variants, inter-module connections can enable voting between processors, sensor fusion, load balancing between backup power sources, and/or any other suitable power/data transfer between modules. In variants retrofitting an existing aircraft and/or installed aftermarket, the harness can integrate with and/or operate in conjunction with (e.g., use a portion of) the existing aircraft harness.

Example Aircraft Remote Update System

Figure 4:
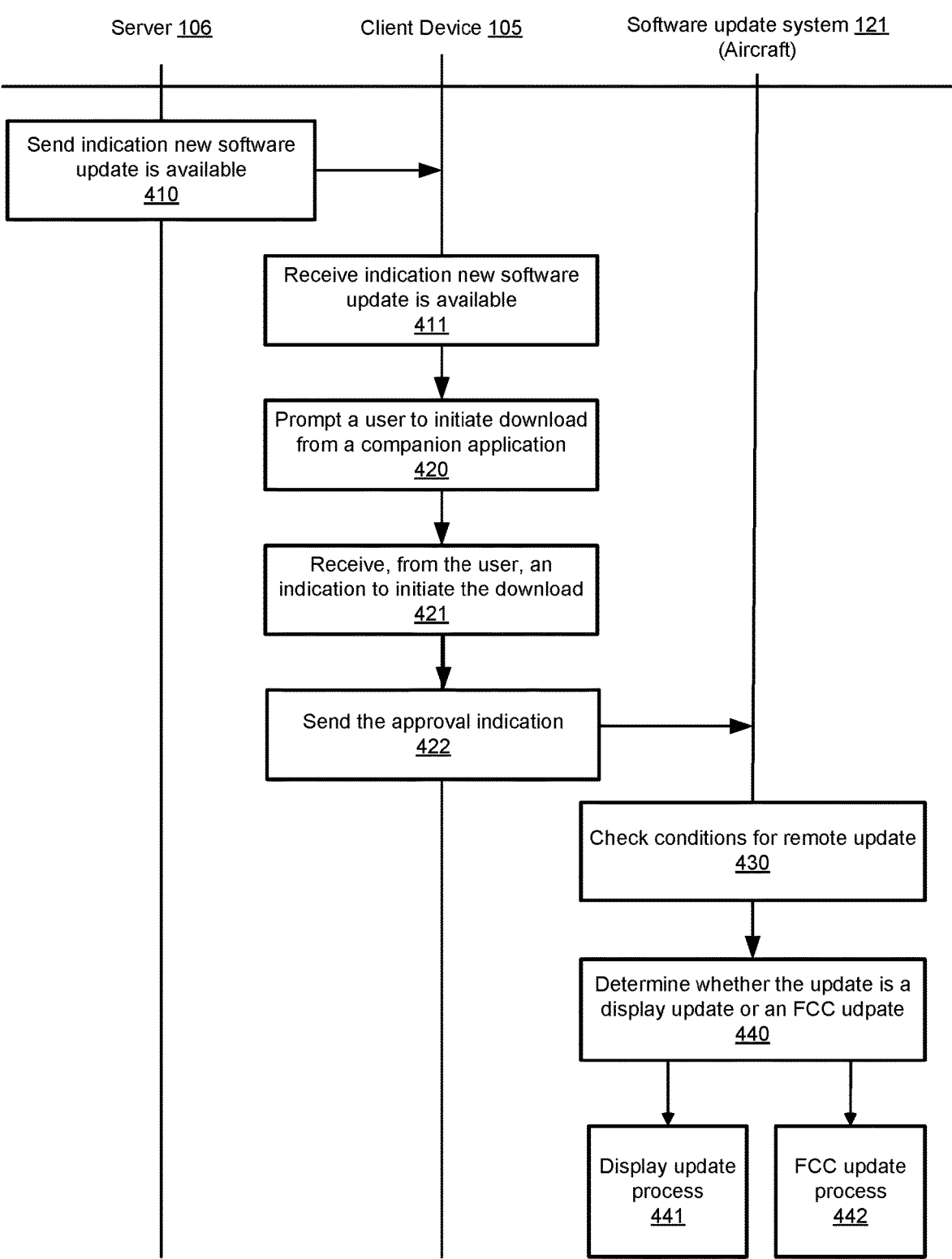
FIG. 4 illustrates an example process for initiating a new software update, in accordance with one or more embodiments.

FIG. 4 illustrates an exemplary process for the software update system 121 to perform an over-the-air update, in accordance with one or more embodiments. The process shown in FIG. 4 may be performed by components of a remote software update system (e.g., the software update system 121). Other entities may perform some or all of the steps in FIG. 4 in other embodiments. Embodiments may include different and/or additional steps, or perform the steps in different orders.

The server 106 may send 410 an indication to the client device 105 that a new software update is available for download. For example, the server 106 may receive a software update. The server 106 may determine which aircraft have not received the update by checking maintenance logs associated with each aircraft. A maintenance log is a digital log that is accessible by the server 106. The maintenance log may list what versions of software for the display and FCC assembly are active on a given aircraft. The client device 105 may receive 411 the message and display the message to a user that uses the companion application installed on the client device 105 to control the aircraft.

Through the companion application installed on a client device, the software update system 121 may prompt 420 the user to initiate download from the companion application. In one embodiment, only authorized users may have the authority to approve software updates remotely from the companion application. The user may approve the download request and send an indication using the client device 105 to initiate the download. The client device 105 may receive 421 the indication from the user and send 422 the approval indication to the software update system 121. In the case of rejection of the software download by the user, the server 106 may reinitiate software update after a period repeatedly until software update is successfully completed and maintenance log is updated.

After the user approves the remote download request, the software update system 121 may query the vehicle sensors 140 to check 430 conditions for the remote update. The software update system 121 may check 430 one or more conditions ensuring that the vehicle is in an appropriate condition for remote update. In one embodiment, the software update system 121 may need a specific type of power source such as on-board battery or shore power. For example, the software update system 121 may ensure that the battery charge level is above a certain threshold if the power source is on-board battery. The software update system 121 may also query network connection data from the sensors. In one embodiment, the software update system 121 may need a specific type of network connection, such as LTE (Long-Term Evolution) connection or a Wi-Fi connection depending on size of the download. For example, if the size of the download of the update is over a predetermined threshold, the software update system 121 may send a message to connect to Wi-Fi without using LTE connection. The software update system 121 may check other requirements such as if the remote update is authorized and if a confirmation is received from the companion application. In addition, the software update system 121 may check whether the aircraft is in flight or parked. In one embodiment, the software update system 121 may only send instructions to the display to download a software update if the aircraft is in flight, and install the update when the vehicle is parked.

The software update system 121 may then determine 440 if the update is an update to the display or an FCC update. If the update is a display update, the software update system 121 may execute a display update process 441, which is further discussed in accordance with FIG. 5. If the update is an FCC update, the software update system 121 may go through an FCC update process, which is further discussed in accordance with FIG. 6.

Figure 5:
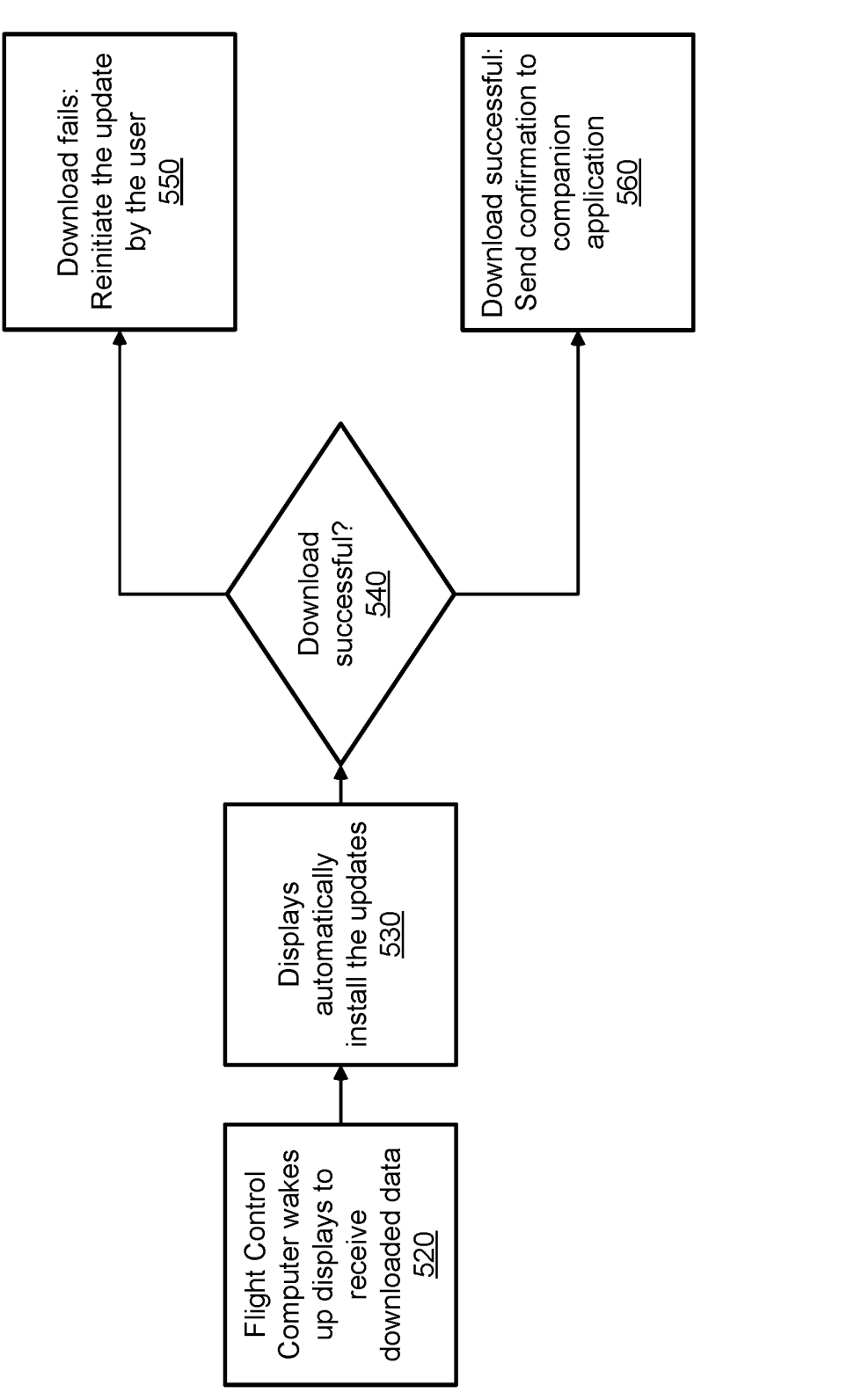
FIG. 5 illustrates an example of a display update process of FIG. 4.

FIG. 5 illustrates an example of the display update process 441 of FIG. 4. Following the process illustrated in FIG. 5, after the set of requirements is met for the remote update, the software update system 121 may initiate the download on the aircraft. One or more of a plurality of the FCCs 320A-320C as illustrated in FIG. 3 may wake up 520 the display to receive downloaded data.

The displays may automatically install 530 the downloaded updates without requiring a human operator (such as a pilot or a technician) to interfere the process. In other words, if the software update system 121 determines that the update is a display update, the software update system 121 may instruct the displays to automatically update themselves. The software update system 121 may further perform integrity checks after the update is installed, ensuring that the update is installed successfully.

The software update system 121 may determine whether the download is successful 540. If the software update system 121 determines that the download fails 550, the software update system 121 may prompt the user of the companion application that the download failed and may provide the user an option to reinitiate the update process by the user. In one embodiment, the re-initiation of the remote update process requires user approval, and the software update system 121 may not re-perform the remote update process without user approval.

If the software update system 121 determines that the download and the installation are successful, the software 121 may send 560 a message (such as a confirmation message) to the companion application that the download and the update are successful. The software update system 121 may further send the status of the update to the server 106. The server 106 may update a maintenance log (e.g., stored in a memory storage on the server 106).

Figure 6:
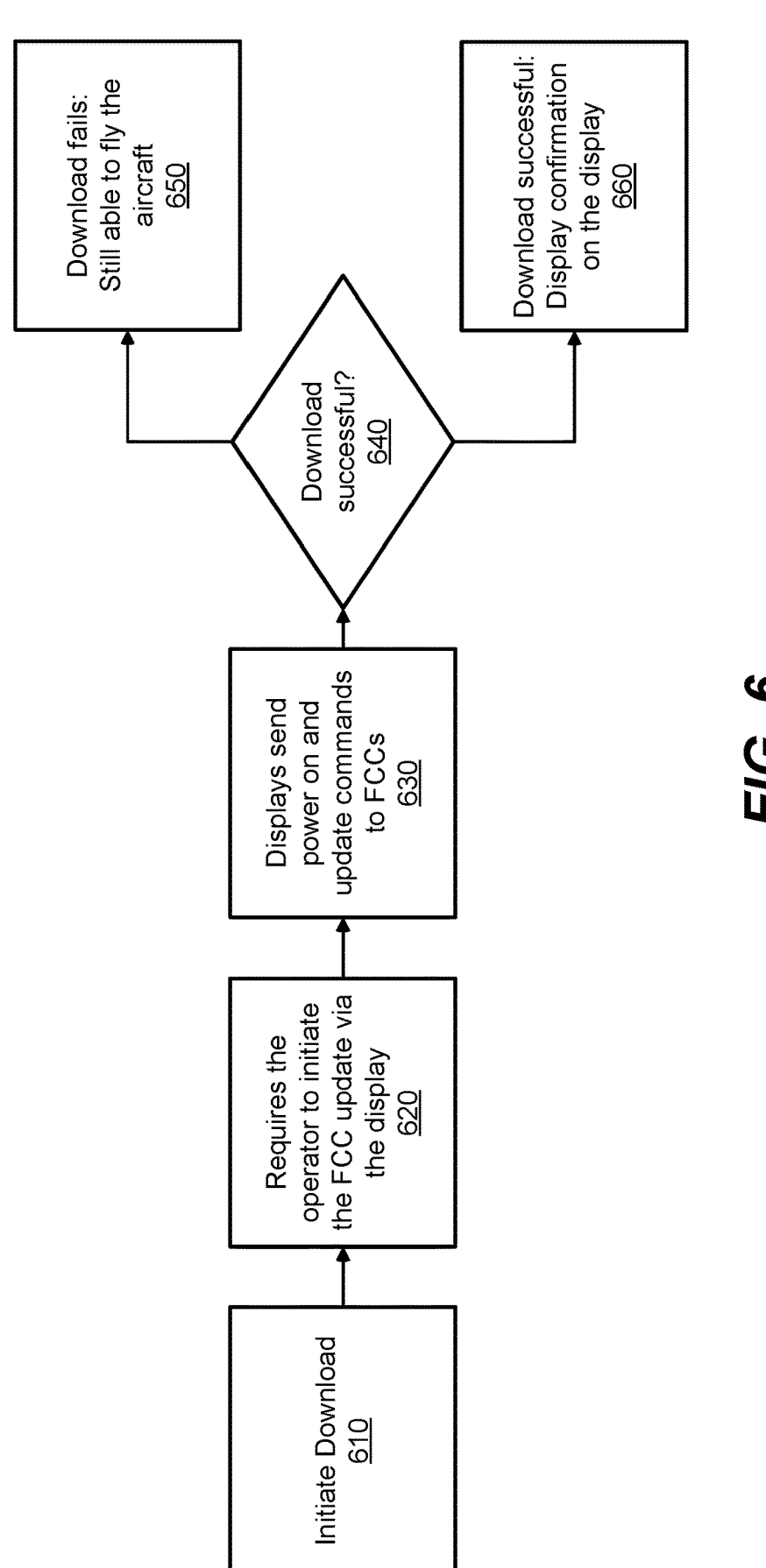
FIG. 6 illustrates an example of an FCC assembly update process of FIG. 4, in accordance with one or more embodiments.

FIG. 6 illustrates an example of the FCC assembly update process of FIG. 4. Following the process illustrated in FIG. 5, if the set of requirements is met for the remote update, the software update system 121 may initiate 610 the FCC download on the aircraft. The displays may receive the downloaded data and store the data to the data store 150.

If the software update system 121 determines that the update is an FCC update, the software update system 121 may require 620 a human operator (such as a pilot or a technician) to initiate the FCC update via the displays. In one embodiment, the human operator may initiate the download of the FCC update in the aircraft before a flight by entering instructions through a cockpit on the aircraft and setting necessary interlock handshake. In one embodiment, a message may be prompted through the display to the pilot to initiate the update.

The displays may receive the instructions and the software update system 121 may instruct the displays to send 630 a plurality of commands to the FCCs. The software update system 121 may send a command to the FCCs to install the updates. In one embodiment the command may include information associated with the update such as the set of updates approved to be installed. The software update system 121 may instruct the displays to send a power-on command after setting necessary interlock handshake to the FCCs, where a power-on command instructs the FCCs to restart on power on and enter maintenance mode until instructed otherwise with a subsequent power-on command. That is, the software update system 121 may ensure that the FCCs stay power on during the remote updating process by instructing the displays to send a power-on command along with the command to install the downloaded updates.

The software update system 121 may determine whether the download and the installation is 640 successful. If the software update system 121 determines that the download fails 650, the software update system 121 may ensure that the flight should not be interrupted. The software update system 121 may keep two copies of the operational software and only update the one copy of the operational software to the latest version during the software updated process. After the successful completion of the security check of the updated copy to ensure that a working operational software is available for continued flight operation, the software update system 121 may use the updated copy as the operational copy and mark the earlier operational copy as an old copy. The software update system 121 may also send a message to the companion application reporting the status of the update. If the update fails, the software update system 121 may prompt the user to approve a re-initiation of the remote update process.

If the software update system 121 determines that the download and the installation are successful 660, the software update system 121 may display 660 a confirmation through the displays. In some embodiments, the software update system 121 may additionally send a message to the companion application, indicating that the remote update is successful. The software update system 121 may further send a status of the update to the server 106. The server 106 may update the maintenance log with the status of the update.

Figure 7:
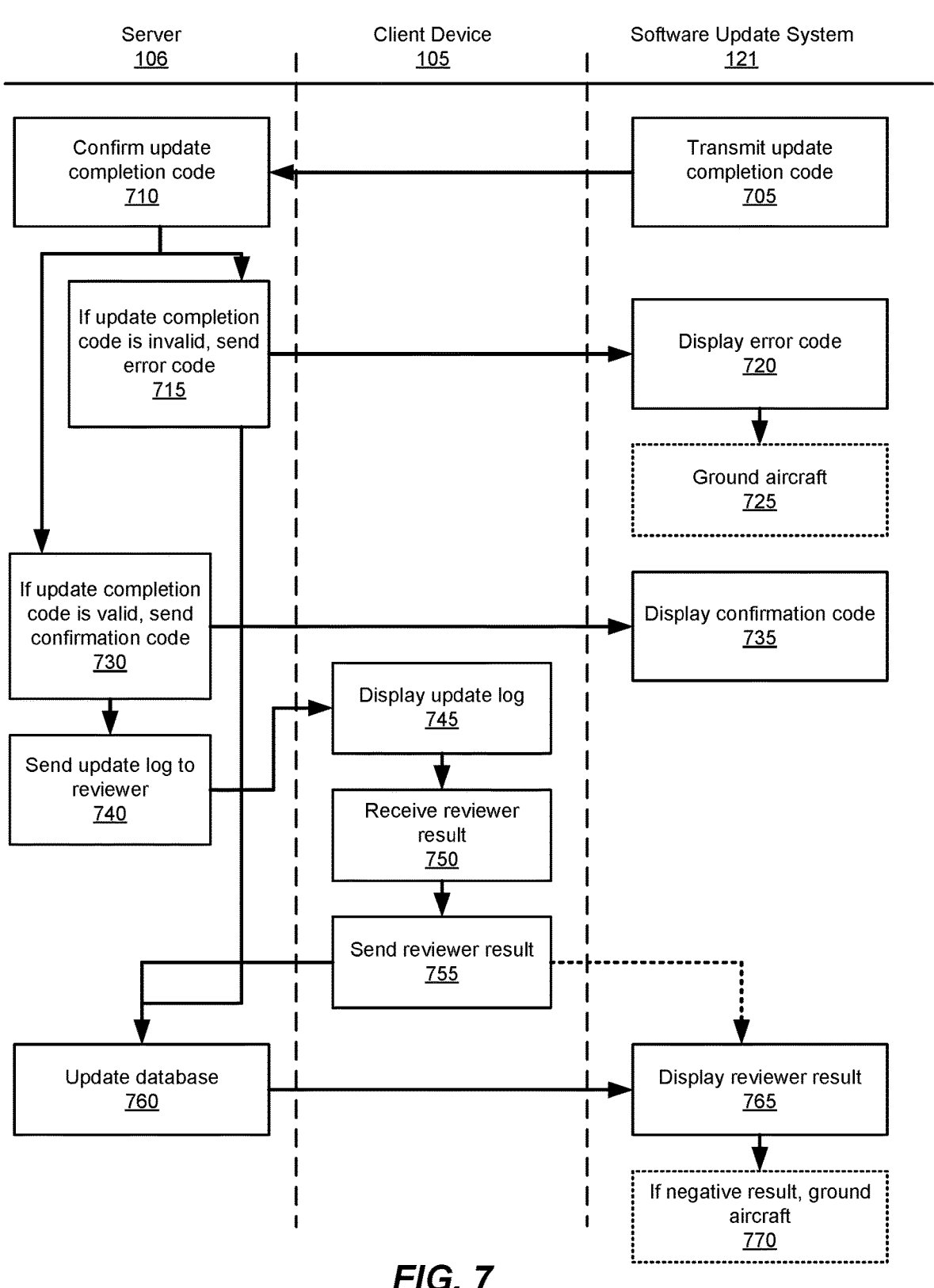
FIG. 7 illustrates an example process for confirming software update, in accordance with one or more embodiments.

FIG. 7 illustrates an example process for reviewing a software update, in accordance with one or more embodiments. In one or more embodiments, software updates may be reviewed by a maintenance technician certified by a regulatory body (e.g., the FAA). The software update system 121 aboard an aircraft may be operated by a non-certified user (e.g., an operator of the aircraft) or the certified maintenance technician. If by the latter, the certified maintenance technician can review and signoff approval (e.g., a positive result) upon completion of the software installation and/or update. If by the former, the server 106 can aid in coordinating the review via the example process shown in FIG. 7.

The diagram in FIG. 7 illustrates the server 106, the client device 105, and the software update system 121. The software update system 121 sends 705 an update completion code to the server 106. The server 106, as described above in FIG. 1, can maintain a database logging software updates across one or more aircrafts in a fleet. The update completion code may comprise one or more CRC codes staggered throughout the software update package. Each CRC code can be verified by the server 106 to check for completeness of the software update. In other embodiments, other types of codes may be provided to the server 106 that assess completion and whether the software update was uncorrupt.

The server 106 confirms 710 the update completion code by verifying the update completion code against an expected code that is stored in a database accessible by the server 106. The expected code may be set in the source code of the software update, e.g., as set by the software developer. The server 106, thereby, can check the update completion code received from the software update system 121 against the expected update completion code. In one or more embodiments, the server 106 checks each CRC code in the update completion code against the expected CRC codes for the software update.

If the update completion code matches to the expected update completion code, the server 106 validates the update completion code received from the software update system 121. The validated completion code may be stored in a database along with a timestamp of the date of validation and aircraft particulars information (e.g., aircraft identifier, date of update, version or rev of the software update, where update was applied, and/or who applied update).

If the update completion code does not match to the expected update completion code, the server 106 may invalidate the update completion code received from the software update system 121. If the update completion code is invalid (i.e., the update completion code does not match an expected code), the server 106 may send 715 an error code to the software update system 121. If invalid, the error code may indicate that the software update was not installed or may have been improperly installed, e.g., software corruption (or some portion thereof was corrupt) or improper installation of the software. If the software update was a critical update or for a critical aircraft system, the error code may further include instructions for enjoining operation of the aircraft.

The software update system 121, upon receiving an error code, may display 720 (e.g., or otherwise provides for display on a screen of a computing device) the error code, e.g., on a graphical user interface aboard the aircraft. The error code may indicate that the software update did not properly install and may provide additional details, for example, the software was corrupted or otherwise improperly installed. The error code may further indicate a priority label of the software update, e.g., critical, optional, or restricted. The error code may further include a prompt to reinitiate the software update. The user of the software update system 121 (e.g., an operator or a maintenance technician) may select the prompt to reinitiate the software update. Upon reinitiation, the software update system 121 may retry the software update (e.g., via the processes described in FIGS. 4-6).

In some embodiments, in response to receiving the error code, the software update system 121 may ground 725 the aircraft. Grounding the aircraft may entail enjoining operation of the aircraft by preventing starting up of control systems (e.g., the universal vehicle control interfaces 110, vehicle actuators 130, vehicle sensors 140, etc.).

If the update completion code is valid, the server 106 sends 730 a confirmation code to the software update system 121. If valid, the confirmation code may indicate the software update was successfully installed and updated, pending further review by a certified reviewer. The conformation code as well as additional details of the installation (e.g., aircraft information, date of installation, location of installation, estimated deadline of reviewer's result, etc.) that may be of interest to the certified reviewer may be stored in a database or database link accessible to the software update system 121.

The software update system 121 may provide for display 735 (e.g., or otherwise provides for display on a screen of a computing device) such confirmation code, e.g., on the graphical user interface aboard the aircraft. For a critical system or update, the confirmation code may still advise or require approval by the certified reviewer prior to operation of the aircraft.

The server 106 sends 740 an update log to the certified reviewer's client device 105. The update log may indicate the software update that was installed. In such embodiments, only validated software updates are provided to the certified reviewer to review.

The client device 105 may display 745 (e.g., or otherwise provides for display on a screen of a computing device) the update log to the certified reviewer. The certified reviewer can review the update log and provide a result to the client device 105.

The client device 105 receives 750 the reviewer's result. The result may be positive indicating approval of the software update or negative indicating disapproval of the software update.

The client device 105 may send 755 the reviewer's result to the server 106 and may also send the reviewer's result to the software update system 121. In one embodiment, a database accessible by the server 106 may comprise an entry (or a profile) for each aircraft managed by the server 106. The entry denotes a unique aircraft identifier for the aircraft and one or more statuses of systems aboard the aircraft (e.g., software version, whether software updates are outstanding, etc.). The server 106 can update (e.g., via the software manager 160) the database to reflect the status of the reviewer's result and/or the validation of the update completion code. If either the update completion code was invalid or the reviewer's result was negative, then the server 106 can denote that the software update was unsuccessful. If both the update completion code is valid and the reviewer's result is positive, then the server 106 can denote that the software update was successful.

In some embodiments, the server 106 sends 755 the reviewer's result to the software update system 121. Upon receipt of the reviewer's result, the software update system 121 may display 765 (e.g., or otherwise provides for display on a screen of a computing device) the reviewer's result, e.g., on a graphical user interface aboard the aircraft. If the result is positive, then the software update system 121 can indicate that the software update was successful. And, if the result if negative, then the software update system 121 can indicate that the software update was unsuccessful.

If the result is negative, the software update system 121 also may ground 770 the aircraft, e.g., enjoining operation of the aircraft. In one embodiment, the grounding may trigger a notification to appropriate parties along with recommendations for further action, e.g., ways to rectify and/or reasons for grounding.

Advantages of the software update review process include utilization of a two-stage check. At the first stage, the server 106 validates the update completion code provided by the software update system 121. Only upon validating the update completion code does the server 106 then proceed with review by the certified reviewer. Further, the software update review process described in FIG. 7 enables remote review of the software update by the certified reviewer. For example, the certified reviewer may not be physically present with the aircraft. Conventionally, the certified reviewer needed to be physically present during the software update to review and signoff approval. The review process described in FIG. 7 enables the certified reviewer to remotely review the software update.

Computing Machine Architecture

Figure 8:
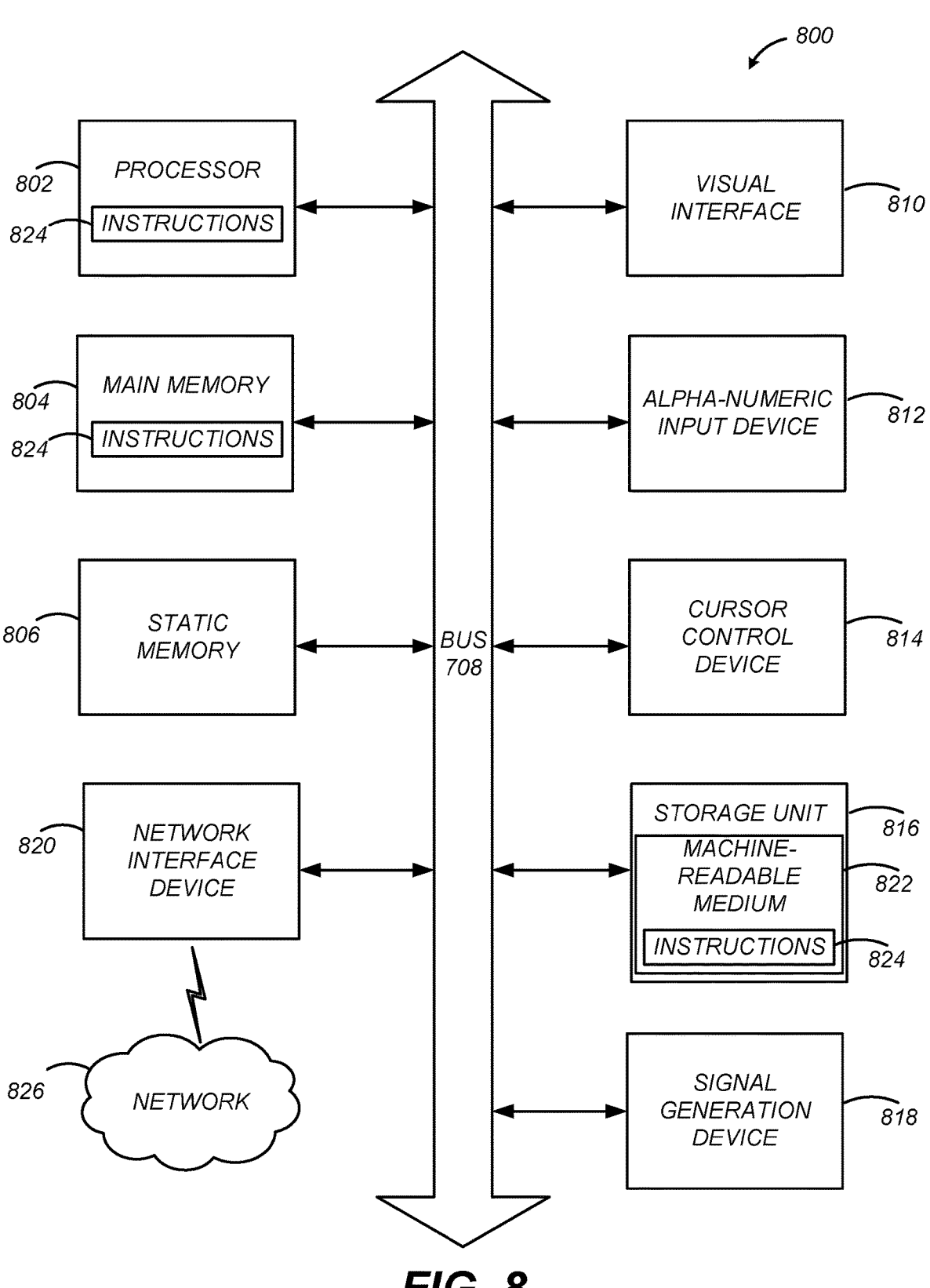
FIG. 8 is a block diagram illustrating components of an example machine able to read instructions from a machine-readable medium and execute them in a processor, in accordance with one or more embodiments.

FIG. 8 is a block diagram illustrating one embodiment of components of an example machine able to read instructions from a machine-readable medium and execute them in a processor (or controller). Specifically, FIG. 8 shows a diagrammatic representation of a machine in the example form of a computer system 800 within which program code (e.g., software) for causing the machine to perform any one or more of the methodologies (processing techniques of the flight control system) discussed herein may be executed. The computer system 800 may be used for one or more components of the vehicle control and interface system 100 depicted and described in FIG. 1. The program code may be comprised of instructions 824 executable by one or more processors 802. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors 802 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 804, and a static memory 806, which are configured to communicate with each other via a bus 808. The computer system 800 may further include visual display interface 810. The visual interface may include a software driver that enables (or provide) user interfaces to render on a screen either directly or indirectly. The visual interface 810 may interface with a touch enabled screen. The computer system 800 may also include input devices 812 (e.g., a keyboard a mouse), a storage unit 816, a signal generation device 818 (e.g., a microphone and/or speaker), and a network interface device 820, which also are configured to communicate via the bus 808.

The storage unit 816 includes a machine-readable medium 822 (e.g., magnetic disk or solid-state memory) on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution.

Additional Configuration Considerations

The disclosed configurations beneficially provide for a vehicle control and interface system that facilitates universal, simple, and safe mechanisms for vehicle operation. Among other advantages, such mechanisms enable significantly reduced training of human operators for effective operation of vehicles of varying types (e.g., aircraft, motor vehicles, watercraft, etc.). For instance, a human operator can operate a variety of vehicles integrated with the vehicle control and interface system after being trained to operate the vehicle control and interface system once. In contrast, conventional control and interface systems for vehicles need individualized and extensive training processes, often involving a licensing or certification procedures for each type of vehicle.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms.

Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for vehicle control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for coordinating review of a software update, the method comprising:
   receiving, from a software update system implemented on an aircraft, an update completion code indicating the software update was installed on a control system for the aircraft, wherein the control system is configured to generate control signals for operating one or more actuators controlling mechanical components of the aircraft;
   confirming the update completion code against an expected update completion code;
   in response to confirming the update completion code as valid:
       sending to the software update system a confirmation code,
       sending to a client device of a certified reviewer an update log indicating the software update installed on the control system; and
       receiving, from the client device, a result from review by the certified reviewer;
   in response to confirming the update completion code as invalid:
       sending to the software update system an error code indicating improper installation of the software update, wherein the error code comprises instructions to enjoin operation of the aircraft by enjoining startup of the control system implemented on the aircraft; and
   updating in a database an entry for the aircraft comprising a unique aircraft identifier, the software update installed on the control system, the update completion code as valid or invalid, and the result from the review.

2. The method of claim 1, wherein the update completion code comprises one or more cyclic redundancy check (CRC) codes staggered throughout the software update.

3. The method of claim 2, wherein confirming the update completion code comprises matching each CRC code against an expected CRC code.

4. The method of claim 1, wherein the error code further comprises
   a prompt to reinitiate the software update.

5. The method of claim 1, wherein the result is either a positive result or a negative result.

6. The method of claim 5, further comprising:
   in response to receiving a positive result, sending to the software update system the positive result indicating successful installation and approval of the software update; and
   in response to receiving a negative result, sending to the software update system the negative result indicating disapproval of the software update.

7. The method of claim 6, wherein the negative result comprises one or both of:
   instructions to enjoin operation of the aircraft; and
   a prompt to reinitiate the software update.

8. A non-transitory computer-readable storage medium storing instructions that, when executed by one or more computer processors, causes the one or computer processors to execute operations comprising:
   receiving, from a software update system implemented on an aircraft, an update completion code indicating the software update was installed on a control system for the aircraft, wherein the control system is configured to generate control signals for operating one or more actuators controlling mechanical components of the aircraft;
   confirming the update completion code against an expected update completion code;
   in response to confirming the update completion code as valid:
       sending to the software update system a confirmation code,
       sending to a client device of a certified reviewer an update log indicating the software update installed on the control system; and
       receiving, from the client device, a result from review by the certified reviewer;
   in response to confirming the update completion code as invalid:
       sending to the software update system an error code indicating improper installation of the software update, wherein the error code comprises instructions to enjoin operation of the aircraft by enjoining startup of the control system implemented on the aircraft; and
   updating in a database an entry for the aircraft comprising a unique aircraft identifier, the software update installed on the control system, the update completion code as valid or invalid, and the result from the review.

9. The non-transitory computer-readable storage medium of claim 8, wherein the update completion code comprises one or more cyclic redundancy check (CRC) codes staggered throughout the software update.

10. The non-transitory computer-readable storage medium of claim 9, wherein confirming the update completion code comprises matching each CRC code against an expected CRC code.

11. The non-transitory computer-readable storage medium of claim 8, wherein the error code further comprises
   a prompt to reinitiate the software update.

12. The non-transitory computer-readable storage medium of claim 8, wherein the result is either a positive result or a negative result.

13. The non-transitory computer-readable storage medium of claim 12, the operations further comprising:
   sending to the software update system the positive result indicating successful installation and approval of the software update upon receipt of a positive result; and sending to the software update system the negative result indicating disapproval of the software update upon receipt of a negative result.

14. The non-transitory computer-readable storage medium of claim 13, wherein the negative result comprises one or both of:

instructions to enjoin operation of the aircraft; and a prompt to reinitiate the software update.

\* \* \* \* \*